(No Model.)
J. B. HERMAN.
Wagon-Axle.
No. 227,777.                    Patented May 18, 1880.
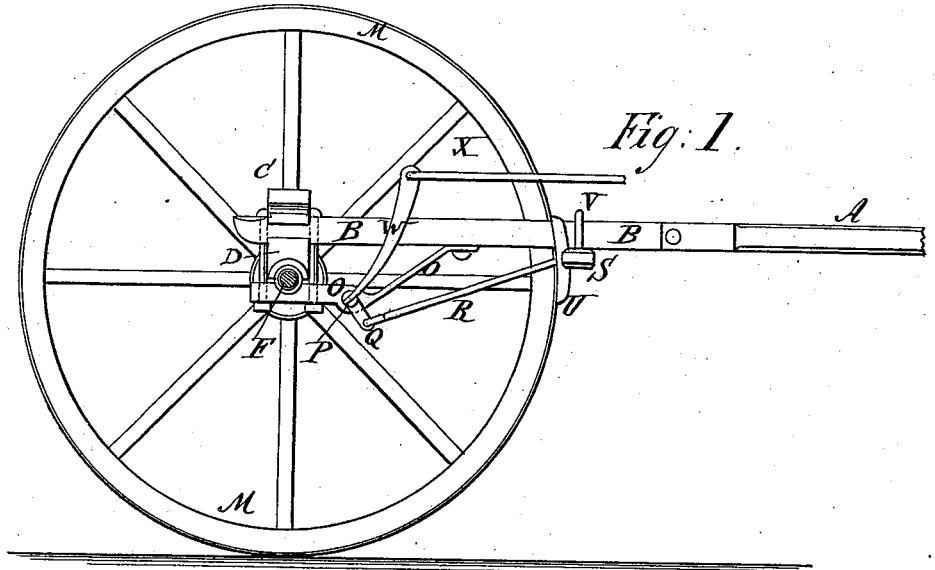
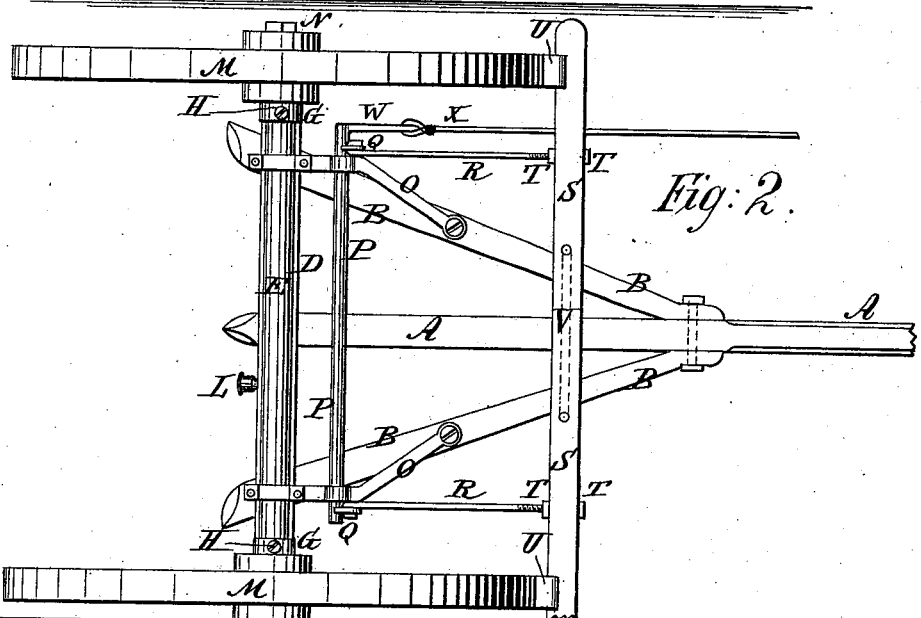
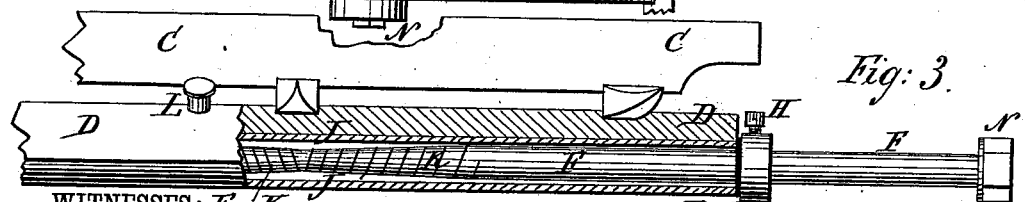
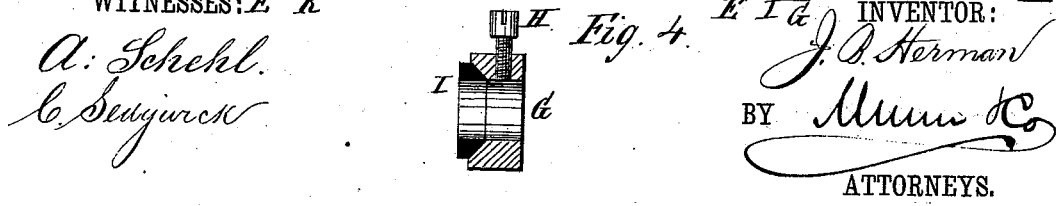
WITNESSES:
A. Schehl.
C. Sedgwick.
INVENTOR:
J. B. Herman
BY Munn & Co
ATTORNEYS.

UNITED STATES PATENT OFFICE.

JOHN B. HERMAN, OF BLAIR, NEBRASKA.

WAGON-AXLE.

SPECIFICATION forming part of Letters Patent No. 227,777, dated May 18, 1880.

Application filed March 18, 1880. (No model,)

*To all whom it may concern:*

Be it known that I, JOHN B. HERMAN, of Blair, in the county of Washington and State of Nebraska, have invented a new and useful Improvement in Wagon-Axles, of which the following is a specification.

Figure 1 is a side elevation of the improvement, one of the wheels being removed. Fig. 2 is a bottom view. Fig. 3 is a rear elevation, partly in section, of the axle. Fig. 4 is a sectional view of one of the collars.

The object of this invention is to furnish wagons so constructed as to run easier than when constructed in the usual way, and in which the bearings can be kept oiled and the brake can be readily applied.

The invention consists in the combination, with the bolster, of the tube, the revolving axle, and the collars having set-screws; also, in constructing the revolving axle with its middle part tapered toward the center and with right and left spiral grooves to feed the oil to the axle-bearings; also, in the combination, with the revolving axle, the tube, and the countersunk collars, of the soft washers to prevent the escape of oil from the ends of the tube.

A is the reach, B are the rear hounds, and C is the rear bolster, of a wagon-gearing.

Below the bolster C is placed a bar, D, the lower side of which is grooved longitudinally to receive the tube E, and the bar and tube are secured to the bolster and hounds B by clips, bolts, and yokes, or other suitable means.

F is the axle, which passes through the tube E, and has collars G placed upon it at the ends of the tube E, which collars are secured in place by set-screws H.

The sides of the collars next the ends of the tube E are countersunk to receive the soft washers I, which are held against the ends of the tube E to prevent the lubricating-oil from escaping.

The middle part of the axle F is tapered toward its center to form an oil-chamber, J, and has right and left spiral grooves K formed upon it to carry the oil toward the end parts of the tube E, which form the bearings for the axle F.

Oil is introduced into the oil-chamber J through a small tube, L, leading in through the bar D and tube E, and having its outer end closed by a screw-cap or plug.

M are the wheels, which are made straight, and the hubs of which are placed upon the end parts of the axle F, where they are secured in place by nuts N, screwed upon the ends of the axle F.

One of the wheels M is clamped so tightly between the collar G and the nut N that it will carry the said axle with it in its revolution. The other wheel M is secured more loosely, so that it can turn upon the axle F in passing around curves and in turning to prevent one of the wheels from sliding.

O are bars, the rear ends of which pass beneath the tube E, and are secured to the bolster C and hounds B by bolts or clips, and which may be the extensions of the yokes that secure the tube E in place. The forward ends of the bars O are bolted to the hounds B.

In bearings in the bars O, a little in front of the tube E, works a rock-shaft, P, to which are attached, or upon which are formed, crank-arms Q.

To the ends of the crank-arms Q are pivoted the rear ends of the rods R, the forward ends of which pass through the brake-bar S, and have screw-threads cut upon them to receive the nuts T, placed upon the opposite sides of the brake-bar S, so that the wear of the brake-shoes U, attached to the ends of the brake-bar S, can be taken up by adjusting the nuts T.

The brake-bar S is suspended from the hounds B and reach A by a keeper, V, or other suitable means.

Upon one end of the rock-shaft P is formed, or to it is attached, a crank-arm or lever, W, to the end of which is attached a rod or chain, X, which is designed to extend forward and be attached to a lever so placed that it can be readily operated by the driver from his seat.

With this construction the line of draft in applying power to the brake will be in the direction to pass beneath the axle F, as shown in Fig. 1.

Having thus described my invention, I claim as new and desire to secure by Letters Patent—

1. The combination, with the bolster C, of the grooved bar D, the tube E, the revolving axle F, and the collars G, having set-screws H, substantially as herein shown and described, whereby the axle is secured in place and held from longitudinal play, as set forth.

2. The revolving axle F, tapered toward its center and provided with the right and left spiral grooves K, substantially as herein shown and described, to form an oil-reservoir, J, and to feed the oil to the axle-bearings, as set forth.

3. The combination, with the revolving axle F, the tube E, and the countersunk collars G, of the washers I, substantially as herein shown and described, whereby the oil is prevented from escaping from the tube E, as set forth.

JOHN B. HERMAN.

Witnesses:
MARTIN BALLARD,
SIMON E. OMO.